D. M. DUNNING, Jr.
SPARK PLUG.
APPLICATION FILED AUG. 24, 1910. RENEWED NOV. 15, 1916.

1,209,820.

Patented Dec. 26, 1916.

UNITED STATES PATENT OFFICE.

DAVID M. DUNNING, JR., OF AUBURN, NEW YORK.

SPARK-PLUG.

1,209,820.  Specification of Letters Patent.  Patented Dec. 26, 1916.

Application filed August 24, 1916, Serial No. 876,779. Renewed November 15, 1916. Serial No. 131,568.

*To all whom it may concern:*

Be it known that I, DAVID M. DUNNING, Jr., a citizen of the United States, residing in Auburn, county of Cayuga, and State of New York, have invented certain new and useful Improvements in Spark-Plugs, of which the following constitutes a full and true description, as required by statute.

Figure 1:
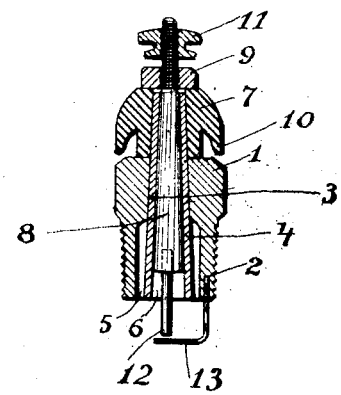
Figure 2:
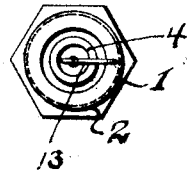
Figure 3:
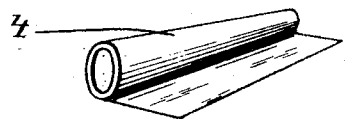
Figure 4:
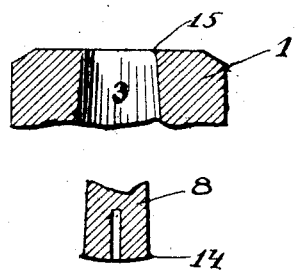

The object of this invention is the production of a spark-plug having maximum efficiency and durability, but composed of few and simple parts, capable of manufacture at slight cost and adapted to be assembled cheaply and with rapidity. To this end the arrangement and formation of the said parts are such that the spark-plug is composed of two metallic electrode-bearing members, two pieces of insulation and two metallic nuts; these being united and held together in a positive and durable manner, as will be hereinafter pointed out and as will appear from the accompanying drawing, wherein:

Figure 1 is an axial section through my improved spark-plug, Fig. 2 a plan view of the inner end thereof, Fig. 3 a detail of the insulating sleeve, and Fig. 4 enlarged details indicating the formation and shape of the preferred form of locking spurs.

The spark-plug comprises the usual metallic electrode-bearing shell with its outer end, that is to say, the end which projects from the outside of the engine cylinder when the plug is in use, formed as a hexagonal head 1, adapted to receive the wrench, and its opposite end 2, threaded so as to fit the tapped hole in the cylinder or cylinder head. The threaded end is provided with a cylindrical, axial recess extending into the shell about half way through the length thereof and the head portion is provided with a central tapered bore 3, of less average diameter than the recess, extending from the latter to and through the outer end of the shell, the convergence of this tapered bore being uniform and toward the outer end. This form of metallic shell is adapted for economical manufacture in the common automatic turning lathe. Inside of the recess and tapered bore 3, is a tapered sleeve 4, made up by winding a sheet of mica upon a tapered mandrel so that it corresponds with the taper of the bore and fits the same closely, with its inner and larger end extended into and preferably terminating within the recess, dividing the latter into two concentric compartments or recesses which I have marked 5 and 6 respectively. The opposite end of the rolled mica sleeve projects beyond the outer end of the shell a distance about equal to the length of the tapered bore in the latter, and here it is surrounded and protected by a ring or collar 7 of insulating material internally bored or shaped with a taper fitting that of the sleeve and externally shaped to give a desired external contour to the plug. The length of the sleeve embracing aperture in this insulating collar is slightly longer than the projecting end of the sleeve, as indicated in the drawings, so that the clamp which holds it in place will not encounter or injure the end of the sleeve. A very slight difference in length will be suitable for this purpose.

The second metallic electrode-bearing member is an inner tapered core 8 having a threaded stem and contained within the shell and sleeve with its stem projecting beyond the latter. The taper of this core conforms to that of the sleeve so when pushed or drawn into the latter it will wedge firmly therein, exerting a strong pressure on the laminated mica sleeve which will serve to prevent the entrance of moisture between its laminations. In this condition the mica sleeve is a most efficient dielectric. The central core terminates at its larger end well within the innermost of the two concentric recesses as indicated in Fig. 2, and its threaded stem carries a clamp nut 9, by means of which the pressure on the sleeve is maintained. The insulating collar 7 is made of non-vitreous, fictile composition adapted to yield slightly under heavy pressure and having the capacity of resisting moderately high temperatures without deterioration. Porcelain is not suitable. The pressure of the clamp nut upon the collar seals the crevices between the latter and the head of shell so as to protect the interior mica sleeve against contact with moisture or dirt and the nut itself closes the opening at the top of the collar. I prefer to form, on the exterior of the collar, a short annular skirt 10, to prevent the possible formation of a moisture film between the collar and the metallic shell. The projecting, threaded stem of the inner electrode also carries an ordinary thumb-nut 11 such as common on binding-posts, and constituting means for attachment of the circuit terminal of the ignition system. Both nuts, as well as the collar, can be cheaply made, the former in the automatic lathe and the latter in molding machines.

The electrodes proper may either be formed on or attached to the extremities of the shell and inner core as desired, but I prefer an arrangement wherein these parts are separately made, out of special wire alloy, and subsequently secured in position on the shell and core as shown in the drawings. The central electrode 12 will thus project from the inclosed head of the core 8, through the center of the inner compartment or recess 6, while the other electrode 13 will bend over from the shell to within a sparking distance from it. As thus arranged it will be observed that the two electrodes and their metallic supports will be separated by both of the annular cavities 5 and 6, constituting a most effective barrier against short-circuiting. It is well known that a cavity, such as either of these, located between the opposite terminals of the plug, will operate to prevent the deposit of carbon which might form a conducting bridge and cause a short-circuit. It will be observed that the larger end of the central core 8 projects within the sleeve 4 beyond the outer end or bottom of the cavity 5, thereby internally supporting the sleeve within said recess.

The security with which the parts above described are held in place by the clamp nut, while sufficient under all normal conditions, is not entirely reliable in that the said nut may become accidentally loosened either by revolving with the thumb-nut 11 or by the effect of constant vibration of the engine, or by the stripping of its threads during the course of manufacture, in any of which cases the inner core is likely to slip back and quickly render the plug useless, if it does not, indeed, fall into the cylinder and break the engine. To guard against this contingency I provide on each of the two metallic members a spur or projection which will dig into and become firmly seated in the mica sleeve when the parts are wedged home. The spur on the inner core member is formed by slightly battering or upsetting its large end to form a shut or fin thereon, as indicated in an exaggerated manner at 14 in Fig. 4. The spur on the shell is located at its upper margin, as indicated at 15 in the same figure, and may be similarly made. In either case the fin or projection may extend continuously around the core or the margin of the shell, or it may only be present at one or more points, provided the three tapered members of the device are thereby safely held together independently of the clamp nut 9, so that even by the removal of the latter altogether, as might occur, for instance, if the stem of the core should be twisted off below the clamp nut by overscrewing the terminal nut 11, the core and sleeve will still be held in place.

I claim the following:

1. A spark plug comprising the combination of an externally threaded electrode-bearing shell having a tapered bore extending to the outer end of the shell, a correspondingly tapered sleeve of rolled sheet mica in said bore, a similarly tapered electrode-bearing core within said sleeve, a solid collar of non-vitreous compressible insulating material surrounding and protecting the mica sleeve which projects from the outer end of the shell, a clamp nut threaded to the core for drawing the tapered parts together and compressing said collar against the shell, said shell and core being provided with projecting spurs which are forced into the outside and inside of the sleeve when the parts are drawn together by said nut, and a terminal attachment nut on the core.

2. A spark-plug comprising a threaded shell having a recess in its threaded end and a tapered bore of less diameter than the recess extending therefrom to and through the outer end of the shell, a correspondingly tapered electrode-bearing core in said bore, a similarly tapered rolled sheet mica sleeve between the core and bore extended into and terminating in the said recess at a point beyond the inner end of the said tapered core, thereby forming two concentric, open compartments and electrodes respectively secured to said shell and core and separated by the two open insulating compartments and the end of the mica sleeve, in combination with a solid collar of non-vitreous compressible insulating material surrounding and protecting the end of the mica sleeve and bearing against the outer end of the shell, the sleeve embracing hole therethrough being slightly longer than the projecting end of the sleeve, a clamp nut threaded on said core and clamping the parts together, and a terminal attachment-nut on said core.

3. A spark-plug comprising an electrode-bearing threaded shell having a recess in its threaded end and a tapered bore of less diameter than the recess extending therefrom to and through the outer end of the shell, a correspondingly tapered electrode-bearing core in said bore, and a similarly tapered rolled sheet mica sleeve between the core and bore extended into and terminating in the said recess at a point beyond the inner end of the said tapered core, thereby forming two concentric, open compartments, the larger end of said core projecting beyond the bottom of the recess in the shell, in combination with a solid collar of non-vitreous compressible insulating material surrounding and protecting the end of the mica sleeve, and a nut threaded on said core beyond said collar and clamping the parts together.

In testimony whereof, I have signed this specification in the presence of two witnesses.

DAVID M. DUNNING, Jr.

Witnesses:
HOBERT B. ROMIG,
SEYMOUR H. KNOX.